United States Patent
Alon et al.

(10) Patent No.: US 12,126,709 B2
(45) Date of Patent: Oct. 22, 2024

(54) POWER ANALYSIS ATTACK PROTECTION

(71) Applicant: NUVOTON TECHNOLOGY CORPORATION, Hsin-chu (TW)

(72) Inventors: Moshe Alon, Tel-Aviv (IL); Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 273 days.

(21) Appl. No.: 17/670,463

(22) Filed: Feb. 13, 2022

(65) Prior Publication Data

US 2023/0037804 A1    Feb. 9, 2023

(30) Foreign Application Priority Data

Aug. 8, 2021    (IL) .......................................... 285456

(51) Int. Cl.
*H04L 9/00* (2022.01)
*H04L 9/06* (2006.01)
(Continued)

(52) U.S. Cl.
CPC ............ *H04L 9/0631* (2013.01); *H04L 9/003* (2013.01); *G06F 21/60* (2013.01); *G06F 21/602* (2013.01);
(Continued)

(58) Field of Classification Search
CPC ....... H04L 9/0631; H04L 9/003; H04L 9/065; H04L 63/0428; H04L 2209/16;
(Continued)

(56) References Cited

U.S. PATENT DOCUMENTS 8,644,515 B2 * 2/2014 Ho ........................ H04L 9/0844
380/278
10,484,169 B1 * 11/2019 Kuroiwa ............. H04L 63/0428
(Continued)

FOREIGN PATENT DOCUMENTS

EP    3089398 B1 * 10/2017    ............. G06F 7/582

OTHER PUBLICATIONS

"Security Best Practices for Side Channel Resistance"—Side Channel Resistance Best Practices, Intel, Mar. 15, 2019 https://www.intel.com/content/www/us/en/developer/articles/technical/software-security-guidance/secure-coding/security-best-practices-side-channel-resistance.html (Year: 2019).*

(Continued)

*Primary Examiner* — Randy A Scott
(74) *Attorney, Agent, or Firm* — MEITAR PATENTS LTD.

(57) ABSTRACT

In one embodiment, a processing device includes a symmetric block cipher configured to encrypt plaintext blocks yielding respective ciphertext blocks, obfuscation circuitry configured to obfuscate the respective ciphertext blocks responsively to an obfuscation secret yielding respective obfuscated ciphertext blocks and an interface to send the respective obfuscated ciphertext blocks to at least one remote processing device. In one embodiment, the processing device provides side-channel attack protection within a symmetric key scheme by data obfuscation and by changing encryption/decryption keys using key manipulation so that different blocks or group of blocks of data are encrypted/decrypted using respective encryption/decryption keys.

6 Claims, 4 Drawing Sheets

(51) Int. Cl.
    *G06F 21/60*         (2013.01)
    *G06F 21/72*         (2013.01)
    *G06F 21/75*         (2013.01)
    *H04L 9/40*          (2022.01)

(52) U.S. Cl.
    CPC ............ *G06F 21/72* (2013.01); *G06F 21/755* (2017.08); *H04L 9/065* (2013.01); *H04L 63/0428* (2013.01); *H04L 2209/16* (2013.01)

(58) Field of Classification Search
    CPC ........ G06F 21/72; G06F 21/60; G06F 21/602; G06F 21/755
    See application file for complete search history.

(56) References Cited

U.S. PATENT DOCUMENTS

| | | |
|---|---|---|
| 2020/0244434 A1 | 7/2020 | Pedersen |
| 2021/0184831 A1* | 6/2021 | Chen ....................... G06F 7/723 |
| 2022/0045848 A1* | 2/2022 | Hulshof ................ H04L 9/3236 |

OTHER PUBLICATIONS

"Side Channels: Attacks, Defenses, and Evaluation Schemes Part 1—Attacks and Defenses"—Oswald et al, University of Klagenfurt, University of Bristol, 2021 https://csrc.nist.gov/csrc/media/Presentations/2021/crypto-club-2021-side-channels-1/images-media/crclub-2021-side-channels-1.pdf (Year: 2021).*
IL Application # 285456 Office Action dated Mar. 12, 2024.

* cited by examiner

POWER ANALYSIS ATTACK PROTECTION

RELATED APPLICATION INFORMATION

The present application claims priority from Israel Patent Application No. 285,456, filed 8 Aug. 2021.

FIELD OF THE INVENTION

The present invention relates to security, and in particular, to symmetric block ciphers.

BACKGROUND

Side-channel attacks try to extract secrets from a device, via measurement and analysis of physical parameters, such as supply current, execution time, and electromagnetic emission. Side-channel attacks pose a serious threat as many side-channel methods have proven successful in breaking an algorithmically robust cryptographic operation (for example, encryption) and extracting the secret key.

Examples of side channel attacks are Simple Power Analysis (SPA) and Differential Power Analysis (DPA) attacks, which are successful and popular attacks that may be used to maliciously extract encryption keys from symmetric encryption engines (or block ciphers). The popular Advanced Encryption Standard (AES) encryption engine (or block cipher) is vulnerable to these attacks.

When an AES encryption engine of a device is active, the power consumption of the engine leaks data, for example, the encryption key. For example, antennas placed externally to the device may be used to detect electromagnetic (EM) radiation emitted by the device in order to derive the encryption key. The attacks are generally performed by examining power consumption over many AES operational cycles using the same key and generally require knowledge of the input or output of AES encryption engine.

There is provided in accordance with an embodiment of the present disclosure, a processing device, including a symmetric block cipher configured to encrypt plaintext blocks yielding respective ciphertext blocks, obfuscation circuitry configured to obfuscate the respective ciphertext blocks responsively to an obfuscation secret yielding respective obfuscated ciphertext blocks, and an interface to send the respective obfuscated ciphertext blocks to at least one remote processing device.

Further in accordance with an embodiment of the present disclosure the symmetric block cipher is an Advanced Encryption Standard (AES) block cipher.

Still further in accordance with an embodiment of the present disclosure, the device includes key manipulation circuitry configured to derive respective encryption keys from a master encryption key and a key manipulation secret, wherein the symmetric block cipher is configured to encrypt respective ones of the plaintext blocks responsively to the respective encryption keys yielding the respective ciphertext blocks.

Additionally in accordance with an embodiment of the present disclosure the symmetric block cipher is configured to encrypt at least two respective ones of the plaintext blocks responsively to each of the respective encryption keys.

Moreover, in accordance with an embodiment of the present disclosure, the device includes a controller configured to derive the obfuscation secret, the key manipulation secret, and the master encryption key from a client-server shared secret.

Further in accordance with an embodiment of the present disclosure the controller is configured to derive the client-server shared secret using an asymmetric key exchange mechanism.

There is also provided in accordance with another embodiment of the present disclosure, a processing device, including an interface to receive respective obfuscated ciphertext blocks from a remote processing device, de-obfuscation circuitry configured to de-obfuscate the respective obfuscated ciphertext blocks responsively to a de-obfuscation secret yielding respective de-obfuscated ciphertext blocks, and a symmetric block cipher configured to decrypt the respective de obfuscated ciphertext blocks yielding respective plaintext blocks.

Still further in accordance with an embodiment of the present disclosure the symmetric block cipher is an Advanced Encryption Standard (AES) block cipher.

Additionally in accordance with an embodiment of the present disclosure, the device includes key manipulation circuitry configured to derive respective decryption keys from a master decryption key and a key manipulation secret, wherein the symmetric block cipher is configured to decrypt the respective de-obfuscated ciphertext blocks responsively to the respective decryption keys yielding the respective plaintext blocks.

Moreover, in accordance with an embodiment of the present disclosure the symmetric block cipher is configured to decrypt at least two respective ones of the de-obfuscated ciphertext blocks responsively to each of the respective decryption keys.

Further in accordance with an embodiment of the present disclosure, the device includes a controller configured to derive the de-obfuscation secret, the key manipulation secret, and the master decryption key from a client-server shared secret.

Still further in accordance with an embodiment of the present disclosure the controller is configured to derive the client-server shared secret using an asymmetric key exchange mechanism.

There is also provided in accordance with still another embodiment of the present disclosure a processing device, including key manipulation circuitry configured to derive respective encryption keys from a master encryption key and a key manipulation secret, and a symmetric block cipher configured to encrypt plaintext blocks responsively to the respective encryption keys yielding respective ciphertext blocks.

Additionally in accordance with an embodiment of the present disclosure the symmetric block cipher is an Advanced Encryption Standard (AES) block cipher.

Moreover, in accordance with an embodiment of the present disclosure the symmetric block cipher is configured to encrypt at least two respective ones of the plaintext blocks responsively to each of the respective encryption keys.

Further in accordance with an embodiment of the present disclosure, the device includes obfuscation circuitry configured to obfuscate the respective ciphertext blocks responsively to an obfuscation secret yielding respective obfuscated ciphertext blocks, wherein the symmetric block cipher is configured to encrypt the plaintext blocks responsively to the respective encryption keys yielding the respective ciphertext blocks, and an interface to send the respective obfuscated ciphertext blocks to at least one remote processing device.

Still further in accordance with an embodiment of the present disclosure, the device includes a controller configured to derive the obfuscation secret, the key manipulation secret, and the master encryption key from a client-server shared secret.

Additionally in accordance with an embodiment of the present disclosure the controller is configured to derive the client-server shared secret using an asymmetric key exchange mechanism.

There is also provided in accordance with still another embodiment of the present disclosure a processing device, including key manipulation circuitry configured to derive respective decryption keys from a master decryption key and a key manipulation secret, and a symmetric block cipher configured to decrypt ciphertext blocks responsively to the respective decryption keys yielding respective plaintext blocks.

Moreover, in accordance with an embodiment of the present disclosure the symmetric block cipher is an Advanced Encryption Standard (AES) block cipher.

Further in accordance with an embodiment of the present disclosure the symmetric block cipher is configured to decrypt at least two respective ones of the ciphertext blocks responsively to each of the respective decryption keys.

Still further in accordance with an embodiment of the present disclosure, the device includes an interface to receive respective obfuscated ciphertext blocks from a remote processing device, and de-obfuscation circuitry configured to de-obfuscate the respective obfuscated ciphertext blocks responsively to a de-obfuscation secret yielding respective de-obfuscated ciphertext blocks, wherein the symmetric block cipher is configured to decrypt the respective de-obfuscated ciphertext blocks responsively to the respective decryption keys yielding the respective plaintext blocks.

Additionally in accordance with an embodiment of the present disclosure, the device includes a controller configured to derive the de-obfuscation secret, the key manipulation secret, and the master encryption key from a client-server shared secret.

Moreover, in accordance with an embodiment of the present disclosure the controller is configured to derive the client-server shared secret using an asymmetric key exchange mechanism.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
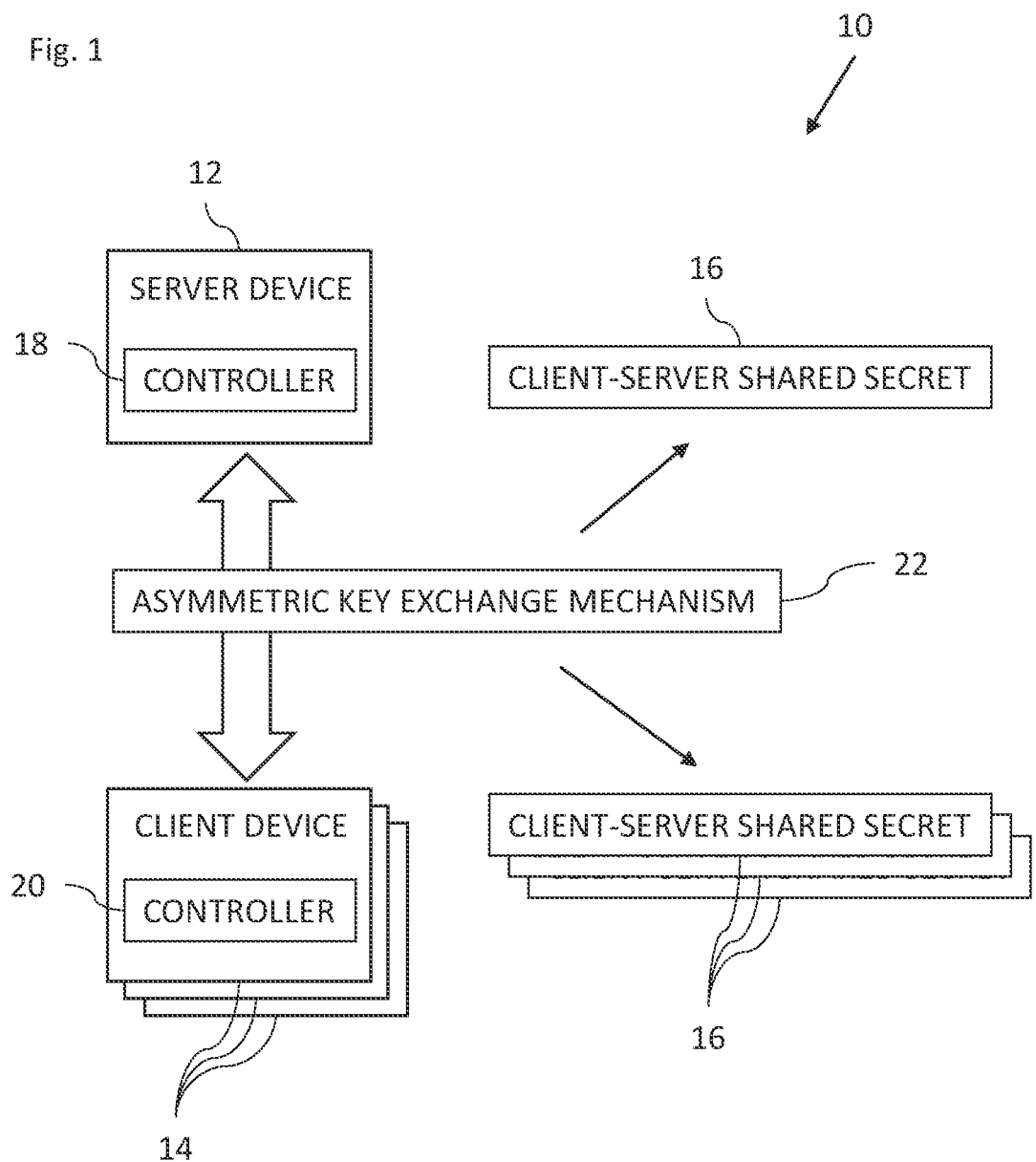
FIG. 1 is a block diagram view of a client-server system constructed and operative in accordance with an embodiment of the present invention.

Symmetric block ciphers may be used in many client-server scenarios in which a server encrypts data using a symmetric encryption/decryption key common to all clients and distributes the encrypted data to all the clients. Each client may then use the common symmetric encryption/decryption key to decrypt the distributed encrypted data. The encryption/decryption key may be distributed to the clients using a secure key exchange mechanism, such as an asymmetric key exchange mechanism, for example, Diffie-Hellman key exchange mechanism. As part of the key exchange mechanism, on the server side, the server private key and client public key is used. While on the client side, the client private key and server public key is used. For example, a server may encrypt and distribute software code to clients. Each client may run the software code provided by the server and the software code may be stored in an encrypted state at the clients until execution of the software code. Each time the software code is changed, the symmetric encryption/decryption key may be changed and distributed using the key exchange mechanism.

As the symmetric encryption/decryption key may be in use for an extended period of time, the symmetric encryption/decryption key may be vulnerable to side channel attack, such as SPA or DPA. In most cases, the server side, which encrypts the distributed data, is secured and controlled (e.g., in a server farm or data center), however the client side, which decrypts the encrypted data is spread out over many sites, may run at the customer location, and is therefore much more vulnerable to attacks. As a result, finding the symmetric encryption/decryption key is easier at one of the clients.

Embodiments of the present invention protect against side channel attacks when using a symmetric block cipher, such as an AES block cipher, for example, at the client side, which is the data receiver.

In some embodiments, protection against side channel attacks is provided by changing the encryption/decryption key using key manipulation so that different blocks or group of blocks of data are encrypted/decrypted using respective encryption/decryption keys. Therefore, side channel attacks are more difficult to perform as the attacks assume that the same key is going to be used for long enough to reveal the key through power usage of the symmetric block cipher. In some embodiments, the key manipulation may be implemented by sharing a master encryption/decryption key and a key manipulation secret between the server and clients using an asymmetric key exchange mechanism, for example, Diffie-Hellman key exchange mechanism. The master encryption/decryption key may then be manipulated responsively to the key manipulation secret to yield the respective encryption/decryption keys at the server and at the clients. In some embodiments, the master encryption/decryption key and the key manipulation secret may be derived from a single client-server shared secret shared between the server and the clients.

Additionally, or alternatively, ciphertext produced by the symmetric block cipher at the server end is obfuscated prior to being distributed to the clients. The obfuscated data is then de-obfuscated by the clients prior to decryption by the symmetric block ciphers at the clients. In this manner, the input to the symmetric block ciphers at the clients is hidden on the communication channel from the server to the clients and therefore, from view of an external attacker, thereby making side channel attacks more difficult to perform, as side channel attacks generally need knowledge of the input or output of the symmetric block cipher to be successful. The obfuscation may be performed responsively to an obfuscation secret and a suitable obfuscation function. In some embodiments, the master encryption/decryption key, the key manipulation secret, and the obfuscation secret may be derived by the single client-server shared secret shared between the server and the clients.

System Description

Reference is now made to FIG. 1, which is a block diagram view of a client-server system 10 constructed and operative in accordance with an embodiment of the present invention. FIG. 1 shows a server device 12 and multiple client devices 14. The server device 12 includes a controller 18. Each client device 14 includes a controller 20. The server device 12 and the client devices 14 derive a client-server shared secret 16. The controller 18 of the server device 12 is configured to derive the client-server shared secret 16, and the controllers 20 of the client devices 14 are configured to derive the client-server shared secret 16, using a secure key exchange mechanism, such as an asymmetric key exchange mechanism (block 22), for example, Diffie-Hellman key exchange mechanism. As part of the key exchange mechanism, the controller 18 of the server device 12 may be configured to use a private key of the server device 12 and respective public keys of the client devices 14 and publicly agreed parameters (e.g., elliptic curve cryptography (ECC) parameters described in more detail below). While on the client side, the controller 20 of each client device 14 is configured to use a private key of that client device 14 and a public key of the server device 12 and the publicly agreed parameters.

Figure 2:
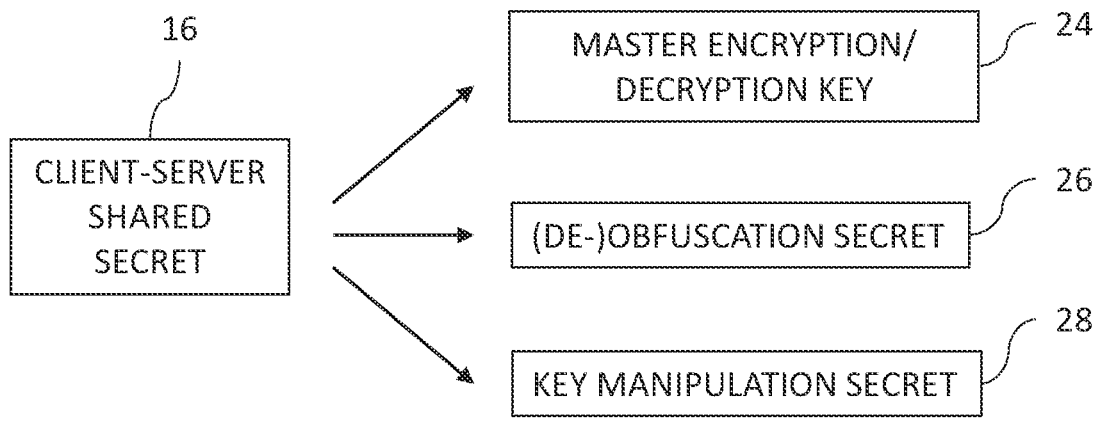
FIG. 2 is a schematic view illustrating derivation of secrets from a client-server shared secret for use in the system of FIG. 1.

Reference is now made to FIG. 2, which is a schematic view illustrating derivation of secrets from the client-server shared secret 16 for use in the system 10 of FIG. 1. The client-server shared secret 16 may be used by the server device 12 and the client devices 14 to provide secrets for use in secure communication between the server device 12 and the client devices 14. In some embodiments, a master encryption key 24 (also referred to as a master decryption key, e.g., when used in the client devices 14), an obfuscation secret 26 (also referred to as de-obfuscation secret 26, e.g., when used in the client devices 14), and a key manipulation secret 28 may be derived from the client-server shared secret 16.

The controller 18 of the server device 12 is configured to derive the master encryption key 24, the obfuscation secret 26, and the key manipulation secret 28 from the client-server shared secret 16. The controller 20 of each client device 14 is configured to derive the master decryption key 24, the de-obfuscation secret 26, the key manipulation secret 28 from the client-server shared secret 16.

The master encryption key 24, obfuscation secret 26, and the key manipulation secret 28 may be derived from the client-server shared secret 16 using any suitable method. In some embodiments, the master encryption key 24, the obfuscation secret 26, and the key manipulation secret 28 may be derived from the client-server shared secret 16 by dividing the data of the client-server shared secret 16 among the master encryption key 24, obfuscation secret 26, and the key manipulation secret 28. In some embodiments, distinct portions of the client-server shared secret 16 may be used to provide the master encryption key 24, the obfuscation secret 26, and the key manipulation secret 28. In these embodiments, the client-server shared secret 16 is longer than the master encryption key 24. For example, the client-server shared secret 16 may be shared based on ECC 384 yielding a 384-bit client-server shared secret 16. The master encryption key 24 may comprise 256 bits of the client-server shared secret 16, while the obfuscation secret 26 and the key manipulation secret 28 may each comprise 64 bits of the client-server shared secret 16.

In some embodiments, some of the data of the client-server shared secret 16 may be shared by any two or more of: the master encryption key 24, the obfuscation secret 26, and/or the key manipulation secret 28. In some embodiments, the client-server shared secret 16 may be expanded to a value which is then divided among the master encryption key 24, the obfuscation secret 26, and the key manipulation secret 28. In other embodiments, the client-server shared secret 16 may be fed into a deterministic random bit generator (DRBG), which provides an output from which the master encryption key 24, the obfuscation secret 26, and the key manipulation secret 28 are derived. One or more rounds of the DREG may be used for this purpose.

In some embodiments, master encryption key 24, obfuscation secret 26, and key manipulation secret 28 may be shared separately by the server device 12 and the client devices 14, so that the master encryption key 24, the obfuscation secret 26 and the key manipulation secret 28 are each shared using a key exchange mechanism.

Figure 3:
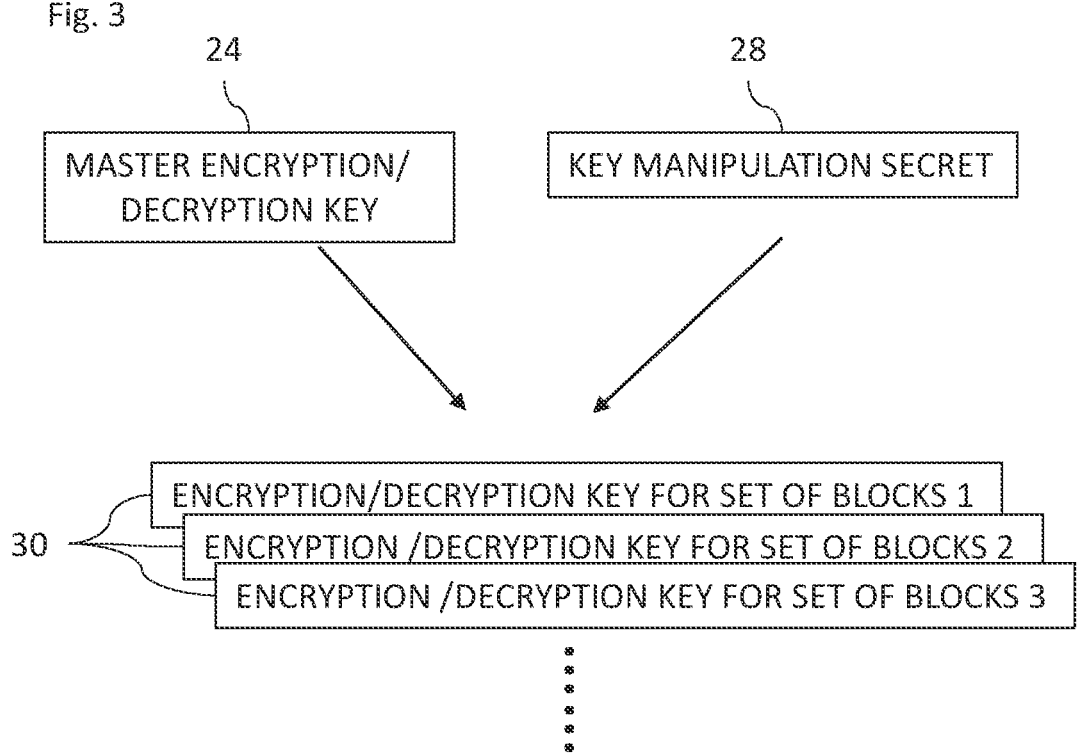
FIG. 3 is a schematic view illustrating derivation of respective encryption keys from a master encryption key for use in the system of FIG. 1.

Reference is now made to FIG. 3, which is a schematic view illustrating derivation of respective encryption/decryption keys 30 from the master encryption/decryption key 24 for use in the system 10 of FIG. 1. The server device 12 encrypts different blocks of data (or different groups of blocks of data) using different encryption keys 30. For example, blocks 1 and 2 may be encrypted using encryption key A, while blocks 3 and 4 may be encrypted using encryption key B, and so on. The size of the groups of blocks may be any suitable size, for example, 2 blocks per group, 3 blocks per group, or more than 3 blocks per group. The encrypted blocks (after optionally being obfuscated) are sent to the client devices 14 for decryption so that each client device 14 decrypts different bloCks of data (or different groups of blocks of data) using different decryption keys 30. For example, blocks 1 and 2 may be decrypted using decryption key A, while blocks 3 and 4 may be decrypted using decryption key B, and so on. Changing the encryption/decryption key 30 frequently makes side channel attacks more difficult to perform as the attacks assume that the same key is going to be used for long enough to reveal the key through power usage of the symmetric block cipher performing the encryption or decryption.

The encryption and decryption processes are described in more detail with reference to FIGS. 4 and 5, below. The respective encryption keys 30 may be derived from the master encryption key 24 and the key manipulation secret 28 as described in more detail with reference to FIG. 4, below.

Figure 4:
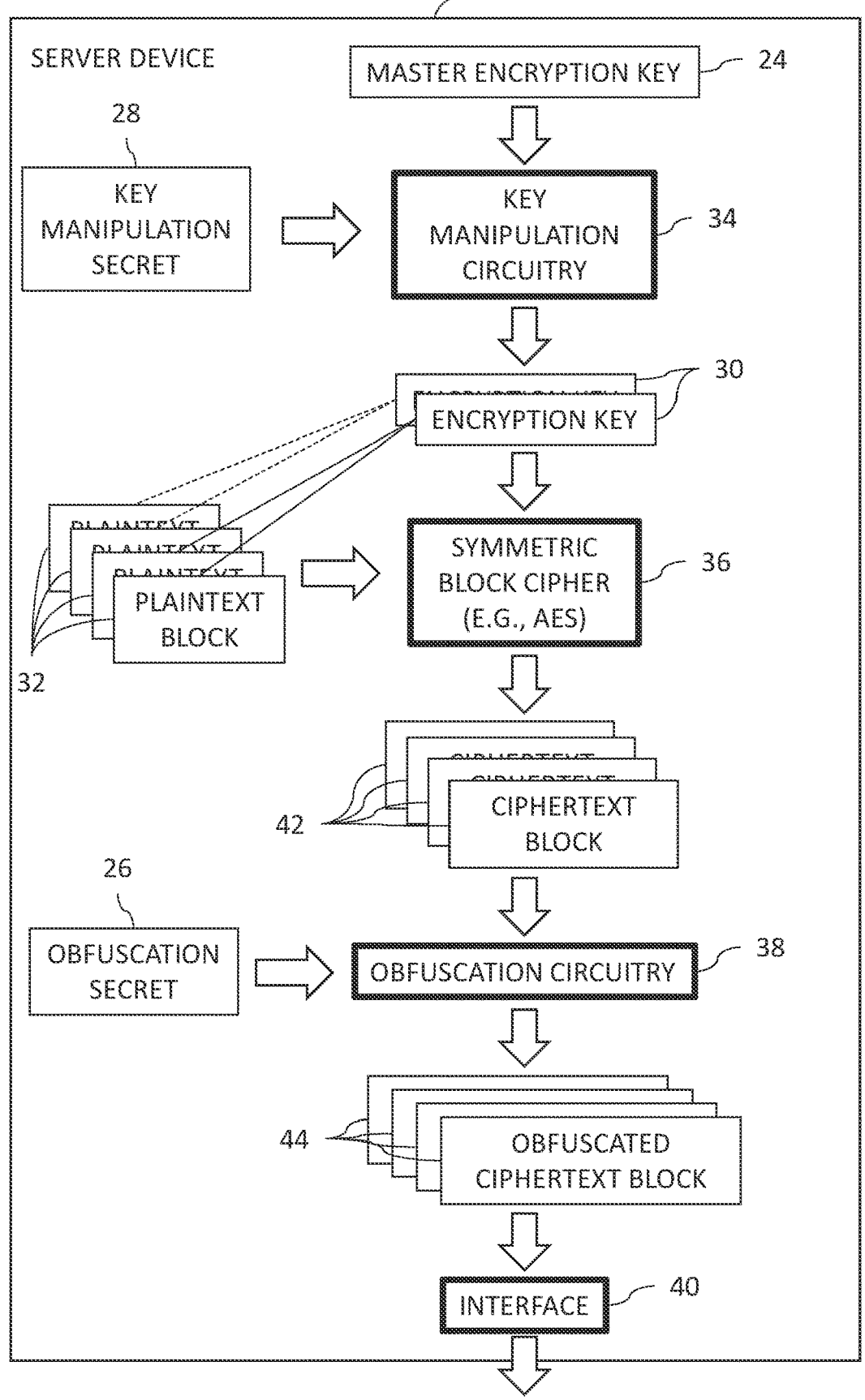
FIG. 4 is block diagram view of a server device in the system of FIG. 1 encrypting plaintext blocks.

Reference is now made to FIG. 4, which is block diagram view of the server device 12 in the system 10 of FIG. 1 encrypting plaintext blocks 32. The server device 12 includes key manipulation circuitry 34, a symmetric block cipher 36, obfuscation circuitry 38, and an interface 40.

The key manipulation circuitry 34 is configured to receive the master encryption key 24 and the key manipulation secret 28 from the controller 18 (FIG. 1) and to derive the respective encryption keys 30 from the master encryption key 24 and the key manipulation secret 28. The key manipulation secret 28 may have any suitable size, e.g., 64 bits, or less than 64 bits (e.g., 32 bits), or more than 64 bits (e.g., 256 bits). Similarly, the key manipulation secret 28 and the encryption keys 30 may have any suitable size, for example, in accordance with the required key size of the symmetric block cipher 36.

The master encryption key 24 and the key manipulation secret 28 may be processed in any suitable manner in order to yield the encryption keys 30. In some embodiments, the key manipulation circuitry 34 is configured to input the master encryption key 24 and the key manipulation secret 28 into a suitable function (e.g., adding the master encryption key 24 to the key manipulation secret 28) yielding one of the encryption keys 30. The output of the function is then input into the function with the key manipulation secret 28 and/or the master encryption key 24 to yield another one of the encryption keys 30, and so on. In some embodiments, the key manipulation circuitry 34 may operate a linear feedback shift register (LFSR) based on an initial value derived from the master encryption key 24 and/or the key manipulation secret 28 and having a feedback loop based on the master encryption key 24 and/or the key manipulation secret 28. The LFSR is then run for a plurality of rounds. After running for some time, the various values of the LFSR then may be used for the respective encryption keys 30.

The symmetric block cipher 36 is configured to encrypt the plaintext blocks 32 yielding respective ciphertext blocks 42. In other words, each respective plaintext block 32 is encrypted to yield a corresponding one of the respective ciphertext blocks 42. In some embodiments, the symmetric block cipher 36 is an Advanced Encryption Standard (AES) block cipher. The symmetric block cipher 36 may be implemented in accordance with any suitable symmetric-key algorithm, such as Twofish, Serpent, AES (Rijndael), Camellia, Salsa20, ChaCha20, Blowfish, CAST5, Kuznyechik, RC4, DES, 3DES, Skipjack, Safer, and IDEA. The symmetric block cipher 36 may be any suitable block cipher which implements a symmetric-key algorithm that uses the same cryptographic keys for both the encryption of plaintext and the decryption of ciphertext. The encryption and decryption keys may be identical, or there may be a simple transformation to go between the encryption and decryption keys 30.

In some embodiments, the symmetric block cipher 36 is configured to encrypt respective ones of the plaintext blocks 32 responsively to the respective encryption keys 30. In some embodiments, each plaintext blocks 32 is encrypted with a different one of the encryption keys 30. For example, block 1 is encrypted with encryption key A, block 2 is encrypted with encryption key B, and so on. In some embodiments, the symmetric block cipher 36 is configured to encrypt at least two respective ones of the plaintext blocks 32 responsively to each of the respective encryption keys 30. In other words, groups of plaintext blocks 32 are encrypted with different respective ones of the encryption keys 30. For example, blocks 1 and 2 may be encrypted using encryption key A, while blocks 3 and 4 may be encrypted using encryption key B, and so on. The size of the groups of blocks may be any suitable size, for example, 2 blocks per group, 3 blocks per group, or more than 3 blocks per group.

Additionally, or alternatively, the respective ciphertext blocks 42 produced by the symmetric block cipher 36 are obfuscated prior to being distributed to the client devices 14. In this manner, the input to the symmetric block ciphers at the clients 14 is hidden on the communication channel from the server device 12 to the client devices 14 and therefore, from view of an external attacker, thereby making side channel attacks more difficult to perform, as side channel attacks generally need knowledge of the input or output of the symmetric block cipher to be successful. Therefore, the obfuscation circuitry 38 is configured to obfuscate the respective ciphertext blocks 42 responsively to the obfuscation secret 26 yielding respective obfuscated ciphertext blocks 44.

The obfuscation circuitry 38 may implement any suitable function to obfuscate the respective ciphertext blocks 42. For example, the obfuscation secret 26 may be expanded (if necessary) to be the same length as each ciphertext block 42 by duplicating or otherwise padding the obfuscation secret 26 and optionally processing the padded result in a cryptographic hash algorithm, such as SHA-3 or MD5 to yield an expanded obfuscation secret with the same length as each ciphertext block 42. The obfuscation circuitry 38 may then combine each of the respective ciphertext, blocks 42 with the expanded obfuscating secret, using a suitable symmetric function such as XOR, DES encryption or AES encryption. In some embodiments, the obfuscation circuitry 38 may add the expanded obfuscation secret to (or subtract from) each of the respective ciphertext blocks 42 to yield the obfuscated ciphertext blocks 44. The obfuscated ciphertext blocks 44 may then be de-obfuscated in the client devices 14 by deducting the expanded obfuscation secret from (or adding to) the obfuscated ciphertext blocks 44 to yield the respective ciphertext blocks 42.

The interface 40 is configured to send the respective obfuscated ciphertext blocks 44 to the client device(s) 14 via any suitable communication channel or network, e.g., the Internet.

In practice, some or all of the functions of the controller 18, the key manipulation circuitry 34, the symmetric block cipher 36, the obfuscation circuitry 38, may be combined in a single physical component or, alternatively, implemented using multiple physical components. These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 5:
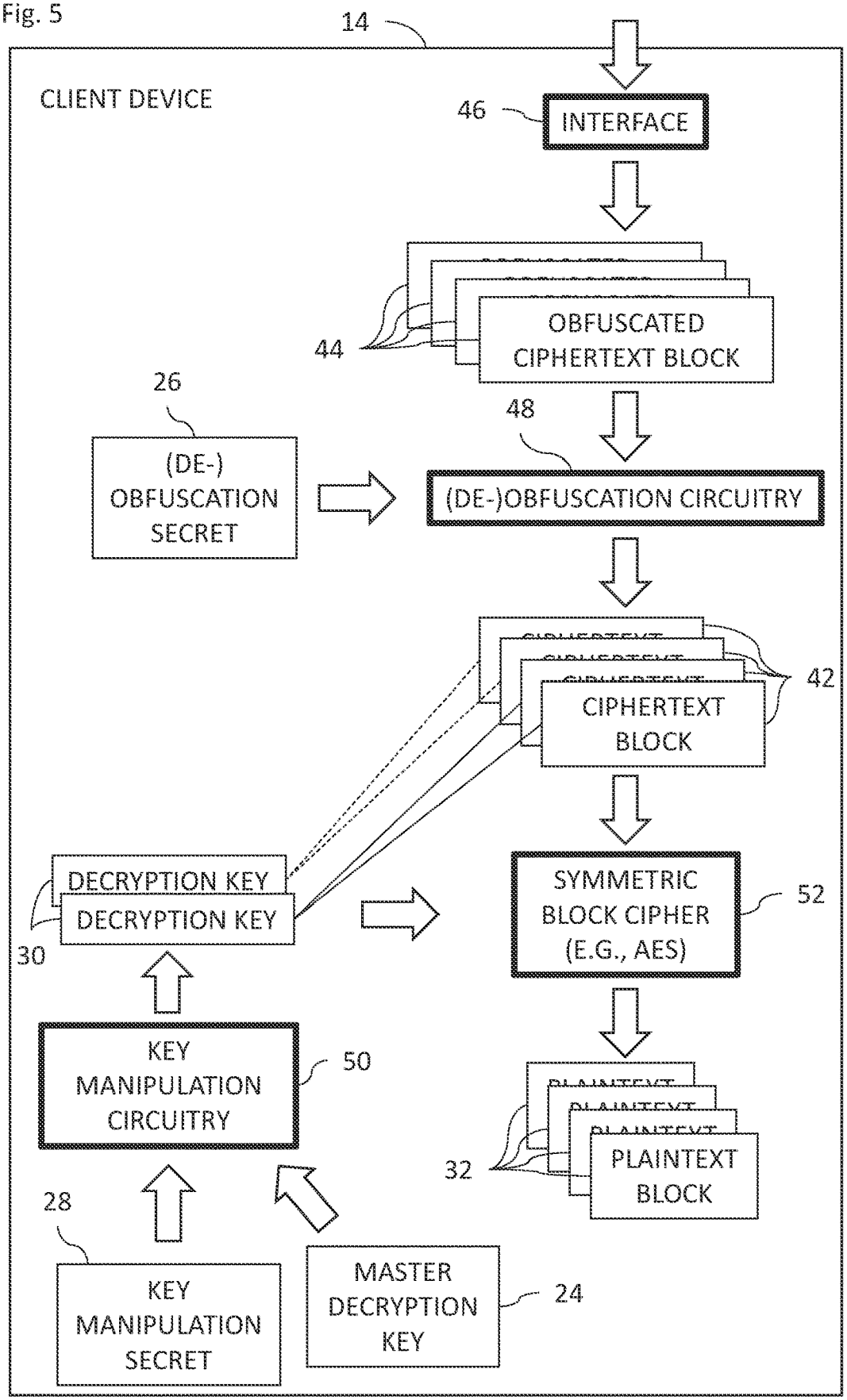
FIG. 5 is a block diagram view of a client device in the system of FIG. 1 processing obfuscated ciphertext blocks.

Reference is now made to FIG. 5, which is a block diagram view of one of the client devices 14 in the system 10 of FIG. 1 processing obfuscated ciphertext blocks 44. The client device 14 includes an interface 46, de-obfuscation circuitry 48, key manipulation circuitry 50, and a symmetric block cipher 52.

The interface 46 is configured to receive the respective obfuscated ciphertext blocks 44 from the server device 12. The elements of the client device 14 are configured to reverse the process performed by the server device 12 taking the obfuscated ciphertext blocks 44 as input and yielding the plaintext blocks 32. It should be noted that the obfuscated ciphertext blocks 44 may be de-obfuscated and decrypted upon receipt from the server device 12 and/or stored in a memory in the client device 14 and retrieved at a later time for de-obfuscating and decrypting. In some cases, the obfuscated ciphertext blocks 44 may be stored and de-obfuscated and decrypted as required and possibly multiple times. For example, software code may be included in the obfuscated ciphertext blocks 44. When the software code is selected to be executed, the obfuscated ciphertext blocks 44 are de-obfuscated, decrypted and executed.

The de-obfuscation circuitry 48 is configured to de-obfuscate the respective obfuscated ciphertext blocks 44 responsively to the de-obfuscation secret 26 (which may be the same as the obfuscation secret 26 used by the server device 12 or a different secret) yielding respective de-obfuscated ciphertext blocks 42. The de-obfuscation circuitry 48 in combination with the de-obfuscation secret 26 performs the opposite operation performed by the obfuscation circuitry 38 of the server device 12. In some embodiments, the de-obfuscation circuitry 48 performs the same function (e.g., XOR, DES decryption and AES decryption) as the obfuscation circuitry 38 with the same obfuscation secret 26. In some embodiments, the de-obfuscation circuitry 48 performs a different function from the obfuscation circuitry 38 with the same obfuscation secret 26. For example, where the obfuscation circuitry 38 adds a value based on the obfuscation secret 26 to the respective ciphertext blocks 42, the de-obfuscation circuitry 48 subtracts the same value from the obfuscated ciphertext blocks 44. In some embodiments, the de-obfuscation circuitry 48 performs a different function from the obfuscation circuitry 38 with a different obfuscation secret 26.

The de-obfuscation secret 26 may be expanded (if necessary) to be the same length as each obfuscated ciphertext block 44 by duplicating or otherwise padding the de-obfuscation secret 26 and optionally processing the padded result in a cryptographic hash algorithm, such as SHA-3 or MD5 to yield an expanded de-obfuscation secret with the same length as each decryption key 30. The de-obfuscation circuitry 48 may then combine each of the respective obfuscated ciphertext blocks 44 with the expanded obfuscating secret, using a suitable symmetric function such as XOR, DES or AES to yield the respective de-obfuscated ciphertext blocks 42.

The key manipulation circuitry 50 is configured to derive respective decryption keys 30 from the master decryption key 24 and the key manipulation secret 28. In some embodiments, the decryption keys 30 are identical to the encryption keys derived by the key manipulation circuitry 34 (or related by a simple transformation).

The symmetric block cipher 52 is configured to decrypt the respective de-obfuscated ciphertext blocks 42 yielding the respective plaintext blocks 32. In some embodiments, the symmetric block cipher 52 is configured to decrypt the respective de-obfuscated ciphertext blocks 42 responsively to the respective decryption keys 30 yielding the respective plaintext blocks 32. The symmetric block cipher 52 may include any suitable block cipher in accordance with the block cipher used to implement the symmetric block cipher 36 of the server device 12. In some embodiments, the symmetric block cipher 52 is an Advanced Encryption Standard (AES) block cipher.

In some embodiments, the symmetric block cipher 52 is configured to decrypt at least two respective ones of the de-obfuscated ciphertext blocks 42 responsively to each of the respective decryption keys 30. In other words, groups of respective ciphertext blocks 42 are decrypted with different respective ones of the decryption keys 30. For example, blocks 1 and 2 may be decrypted using decryption key A, while blocks 3 and 4 may be decrypted using decryption key B, and so on. The size of the groups of blocks may be any suitable size, for example, 2 blocks per group, 3 blocks per group, or more than 3 blocks per group. However, the size of the groups of the blocks is generally limited by the size of the blocks used by the server device 12.

In practice, some or all of the functions of the controller 20, the de-obfuscation circuitry 45, the key manipulation circuitry 50, and symmetric block cipher 52 may be combined in a single physical component or, alternatively, implemented using multiple physical components. These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A processing device, comprising:
   a controller configured to:
      derive a client-server shared secret using an asymmetric key exchange mechanism; and
      derive an obfuscation secret, a key manipulation secret, and a master encryption key from the client-server shared secret;
   key manipulation circuitry configured to derive respective encryption keys from the master encryption key and the key manipulation secret;
   a symmetric block cipher configured to encrypt plaintext blocks responsively to the respective encryption keys yielding respective ciphertext blocks;
   obfuscation circuitry configured to obfuscate the respective ciphertext blocks responsively to the obfuscation secret yielding respective obfuscated ciphertext blocks; and
   an interface to send the respective obfuscated ciphertext blocks to at least one remote processing device, thereby protecting against side channel attacks.

2. The device according to claim 1, wherein the symmetric block cipher is an Advanced Encryption Standard (AES) block cipher.

3. The device according to claim 1, wherein the symmetric block cipher is configured to encrypt at least two respective ones of the plaintext blocks responsively to each of the respective encryption keys.

4. A processing device, comprising:
   a controller configured to:
      derive a client-server shared secret using an asymmetric key exchange mechanism; and
      derive a de-obfuscation secret, a key manipulation secret, and a master decryption key from the client-server shared secret;
   key manipulation circuitry configured to derive respective decryption keys from the master decryption key and the key manipulation secret;
   an interface to receive respective obfuscated ciphertext blocks from a remote processing device, thereby protecting against side channel attacks;
   de-obfuscation circuitry configured to de-obfuscate the respective obfuscated ciphertext blocks responsively to the de-obfuscation secret yielding respective de-obfuscated ciphertext blocks; and a symmetric block cipher configured to decrypt the respective de-obfuscated ciphertext blocks responsively to the respective decryption keys yielding respective plaintext blocks.

5. The device according to claim 4, wherein the symmetric block cipher is an Advanced Encryption Standard (AES) block cipher.

6. The device according to claim 4, wherein the symmetric block cipher is configured to decrypt at least two respective ones of the ciphertext blocks responsively to each of the respective decryption keys.

* * * * *